A. B. CATTERALL.
COMBINED VALVE CAP AND DUST CAP.
APPLICATION FILED MAY 26, 1919.
1,336,023.
Patented Apr. 6, 1920.
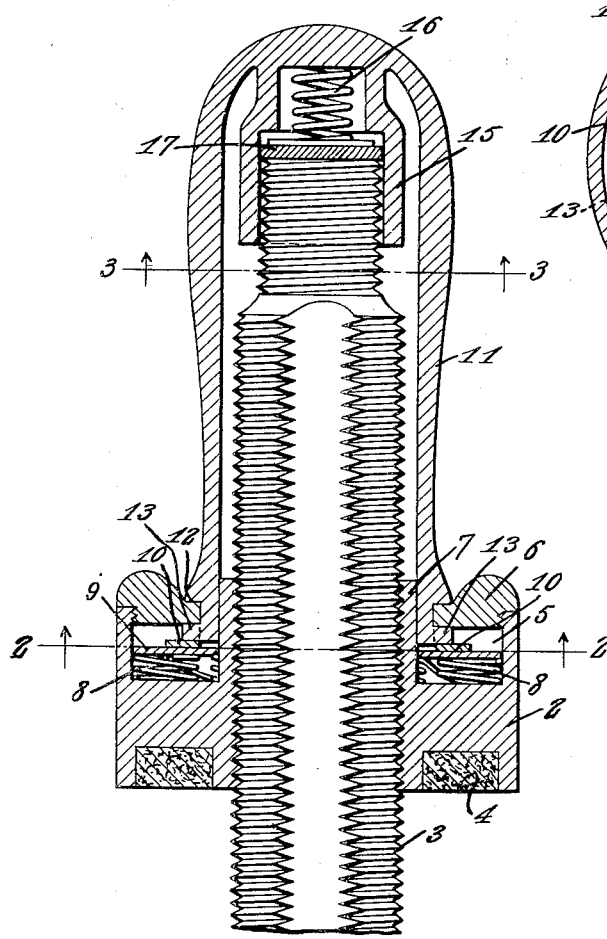
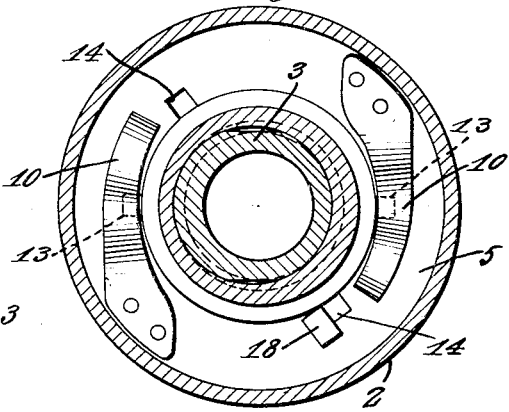
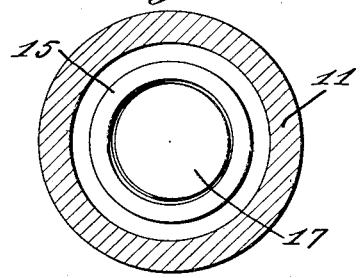
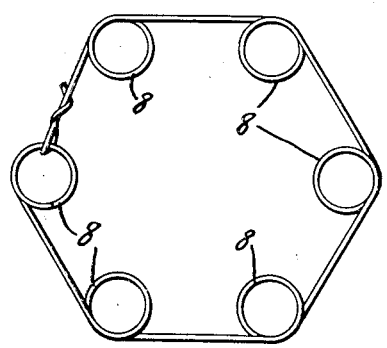
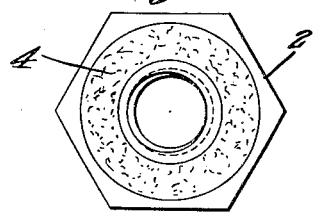
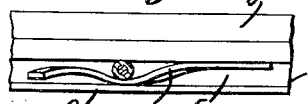
A. B. Catterall, Inventor

UNITED STATES PATENT OFFICE.

ALBERT BAXTER CATTERALL, OF OTTUMWA, IOWA.

COMBINED VALVE-CAP AND DUST-CAP.

1,336,023.

Specification of Letters Patent.

Patented Apr. 6, 1920.

Application filed May 26, 1919. Serial No. 299,874.

*To all whom it may concern:*

Be it known that I, ALBERT B. CATTERALL, a citizen of the United States, residing at Ottumwa, in the county of Wapello and State of Iowa, have invented a new and useful Combined Valve-Cap and Dust-Cap, of which the following is a specification.

This invention relates to improvements in a combined valve cap and dust cap for use in connection with pneumatic tire valves, the primary object of the invention being to provide a combined cap of the character set forth which can be readily and quickly detached from the valve stem, but when in position thereon is securely locked against accidental displacement.

A further object of the invention is the provision of a cap of this character which is comparatively simple in construction, consists of few parts, and is economical to manufacture.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a vertical section showing my improved cap in position on the valve stem of a pneumatic tire;

Fig. 2 is a cross section thereof, taken on the line 2—2 of Fig. 1;

Fig. 3 is a cross section taken on the line 3—3 of Fig. 1;

Fig. 4 is a detail plan view illustrating the formation of the cushioning springs that may be used in my improved cap;

Fig. 5 is a bottom plan view of the nut, somewhat reduced,

Fig. 6 is a detail view of the locking connection between the cap and nut.

The same characters of reference designate the same parts in the different figures of the drawings.

Referring to the drawings, 2 designates a lock nut, which is interiorly threaded and adapted to be screwed on the usual valve stem 3 with which pneumatic tires are provided. The nut has formed in its lower face an annular recess adapted to receive the usual flexible packing or gasket 4 and in its upper face with a somewhat larger annular recess 5. The outer wall of the recess 5 is interiorly threaded at its upper end for the reception of an annular member or ring 6, Fig. 1, the inner wall of the recess extending some distance higher than said outer wall, as shown at 7, for a purpose to be hereinafter described. Within the recess 5 are seated a plurality of coil springs 8, which are herein shown as formed of a single piece of wire. In the present instance I provide a washer 9 seated on the upper ends of the springs 8, thereby entirely inclosing them within the lower part of the recess 5. I desire to have it understood, however, that the springs and washer could be entirely omitted without departing from the spirit of my invention. Secured to the under side of the ring 6 are a pair of diametrically oppositely disposed springs 10 of generally curved formation to approximately correspond with the circumference of the ring, and also curved longitudinally thereof to provide a slight bulge for the reception of the lugs of the dust cap, as clearly shown in Fig. 6.

My improved combined cap in the present instance comprises a dust cap proper 11, that is entirely smooth at its interior and provided with a circumferential flange 12 adjacent to its lower end. The cap 11 carries at its extreme lower end, at diametrically opposite points, a pair of laterally extending lugs 13 adapted to pass through a pair of slots 14 formed in the inner edge of the ring 6, the space between the upper side of said lugs and the under side of the flange 12 being approximately equal to the thickness of said ring. The cap 11 has formed interiorly thereof, at its upper end, an auxiliary cap 15, which is also smooth or threadless at its interior, and secured to the innermost end of this cap 15 is a helical spring 16, the opposite end of which has secured to it a disk 17.

In assembling the cap on the valve stem of a tire, the nut 2 having secured therein the ring 6, is screwed down on the valve stem. The cap 11 is then slipped down over the stem and its lugs 13 passed through the slots 14 in the ring, so that the flange 12 seats on the upper side of said ring. The cap is then given a slight twist or turn, whereupon the lugs pass between the springs 10 and the ring 6, the free ends of the springs being slightly bent downwardly to facilitate the engagement of the lugs therewith and the ring 6 being provided with a projection or lug 18 adjacent to one of the openings 14 to prevent turning of the cap in the wrong direction. It will thus be seen that by this simple operation the cap is securely locked to the nut and at the same time the washer 17 carried by the valve cap 15 is seated on top of the valve stem and held in contact therewith by its spring 16. When it is desired to remove the cap, all that is necessary is a slight twist in the opposite direction in order to release the lugs 13 from the springs 10, whereupon cap may be removed.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claims appended hereto.

Having thus described my invention, what I claim is:

1. A device of the class described comprising a nut provided in its upper face with a recessed channel, an annular member secured within said channel and provided with oppositely disposed slots, a pair of oppositely disposed spring members secured by one end to said annular member upon opposite sides of said slots, and a threadless cap having its lower end equipped with a pair of oppositely disposed lugs for passage through said slots to be engaged between said spring members and said annular member.

2. A device of the class described, comprising a nut provided in its upper face with a recessed channel, an annular member secured within said channel and provided with oppositely disposed slots, a pair of oppositely disposed spring members secured by one end to said annular member upon opposite sides of said slots, said spring members having bulging portions, and a threadless cap having its lower end equipped with a pair of oppositely disposed lugs for passage through said slots to be engaged between said spring members and said annular member.

3. The combination with a stem, a nut provided in its upper face with a recessed channel, an annular member secured within said channel, a spring pressed washer in said recessed channel and urged toward said annular member, of a plurality of spring members interposed between said spring pressed washer and said annular member and secured to the annular member, and a threadless cap having its lower end received in said recessed channel and between said spring members and said annular member for retaining said cap upon said stem.

In testimony that I claim the foregoing as my own, I have hereto affixed my signature in the presence of two witnesses.

ALBERT BAXTER CATTERALL.

Witnesses:
 OTTO T. HEYDRICK,
 C. D. DULIN.